June 7, 1960

E. BERKLEGE 2,939,343

POWER LOAD EQUALIZER

Filed June 7, 1957

INVENTOR.
EMIL BERKLEGE
BY
Hyde, Meyer, Baldwin & Doran
ATTORNEYS

June 7, 1960

E. BERKLEGE 2,939,343

POWER LOAD EQUALIZER

Filed June 7, 1957

INVENTOR.
EMIL BERKLEGE

BY
Hyde, Meyer, Baldwin & Doran
ATTORNEYS

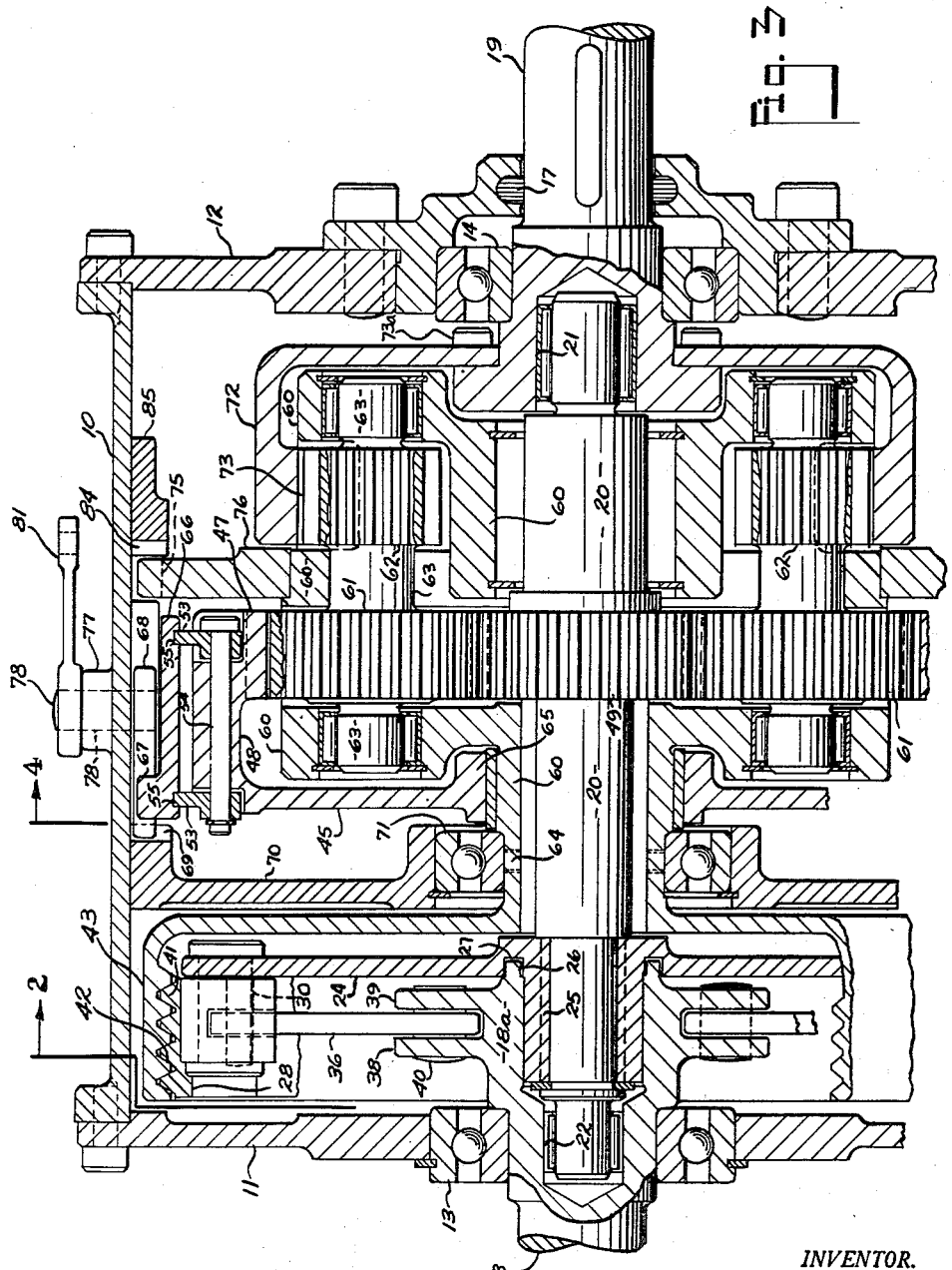

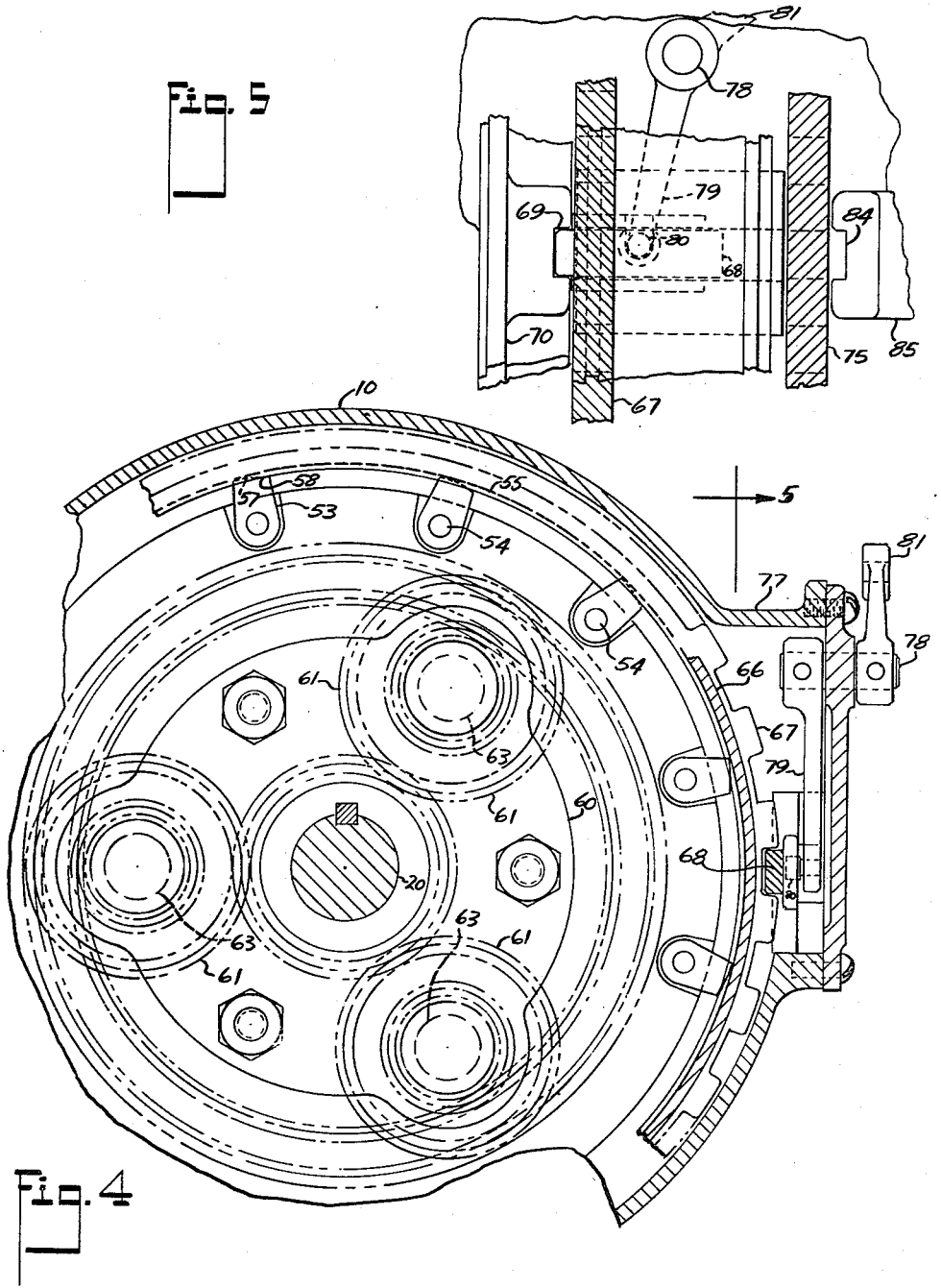

United States Patent Office 2,939,343
Patented June 7, 1960

2,939,343

POWER LOAD EQUALIZER

Emil Berklege, 3403 East Blvd., Cleveland, Ohio

Filed June 7, 1957, Ser. No. 664,398

9 Claims. (Cl. 74—752)

This invention relates to power transmission devices and more particularly to those devices utilizing power supplied thereto, and transmitted in the form of rotary motion from a driving member to a driven member.

An object of the present invention is to provide means for the transmission of power as aforesaid in such manner as to initially produce a powerful torque through reduction gearing which will overcome starting and acceleration inertia and other heavy load variables; the aforesaid means being instantaneously responsive to variations in load conditions, but normally tending to eventually produce a 1:1 ratio between the rotary movement of the driving and driven members.

A further object of the present invention is to provide means for the transmission of power through mechanical media, the elements of which include reduction gearing in operative association with additional means for transmitting variable torque automatically controlled in response to the requirements of the load or in response to the variations of power in the input.

A further object of the present invention is to provide a power transmission wherein means is provided for manual modification of the driving effect so as to reverse the relative direction of rotation between the driving and driven shafts.

A further object of the present invention is to provide transmission means characterized by its structural simplicity, the ease of assembly of its parts, its strong and sturdy nature, its low manufacturing cost, and a mechanism which will perform in a more efficient manner and have torque control in its operation. Other features of this invention reside in the arrangement and design of the parts for carrying out their appropriate functions.

Further objects of the present invention and certain practical advantages will be referred to in or will be evident from the following description of two embodiments of the invention, as illustrated in the accompanying drawings in which:

Fig. 3 is a vertical sectional view of another embodiment of my invention;

Fig. 4 is a transverse vertical sectional view taken along the plane of line 4—4 of Fig. 3;

Fig. 5 is a fragmentary sectional view taken along the plane of line 5—5 of Fig. 4.

Before describing in detail the herein disclosed embodiments of the present invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

Figure 1:
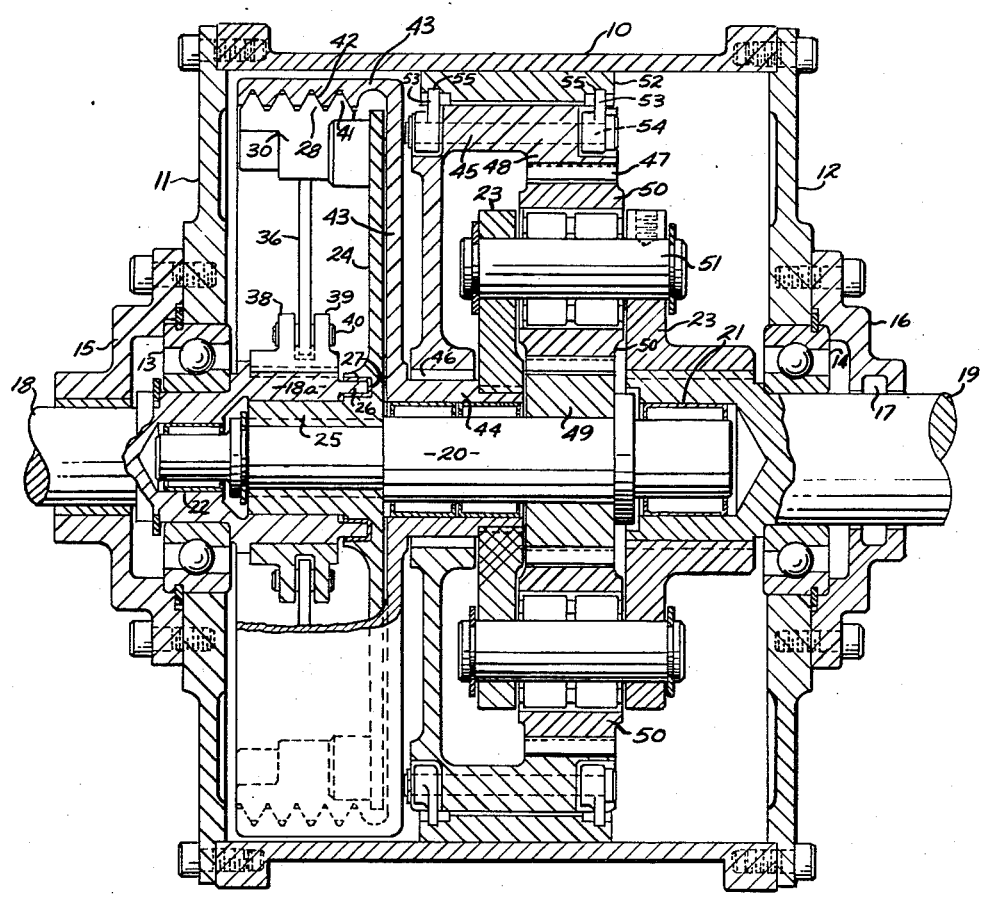
Fig. 1 is a vertical sectional view taken centrally through one embodiment of my transmission substantially on the axis of rotation of the driving and driven shafts.
Figure 1:
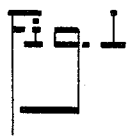

Referring now to the embodiment of the invention shown in Fig. 1, there is illustrated a stationary housing 10 closed at each end by means of end plates 11 and 12. The end plates are provided with axial apertures in which are mounted bushings 13 and 14 respectively. The end plates 11 and 12 are further provided with centrally bored caps 15 and 16 respectively. The end cap 16 may be fitted with a seal 17 for the purpose of retaining lubricating oil contained within the housing. A drive shaft 18 enters through end cap 15 and is journalled in bearing 13 and a driven shaft 19 extends outwardly through cap 16 and is journalled for rotation in bearing 14. The drive shaft 18 and driven shaft 19 are in axial alignment. An intermediate shaft 20 has one end thereof disposed with operating clearance in a bore 21 provided at the inner end of driven shaft 19 and the other end thereof supported with operating clearance in a bore 22 provided at the inner end of drive shaft 18. The driven shaft 19 is integral with a planet gear carrier 23 contained within the housing 10.

The intermediate shaft 20 is provided with an anchor plate 24 having a hub 25 which is securely keyed to the intermediate shaft. As seen in Fig. 1, the hub 25 is journalled within an enlarged end portion 18a provided at the inner end of the drive shaft 18. The anchor plate 24 and its associated hub 25 have limited lost motion rotative movement in portion 18a, as determined by circumferentially spaced projections 26 (Fig. 2) formed integrally with the drive shaft 18, and extending into segmental slots 27 in hub 25. The slots 27 are substantially wider circumferentially than the width of the projections 26 thereby providing the aforesaid lost motion connection between the intermediate shaft 20 and the anchor plate 24.

Figure 2:
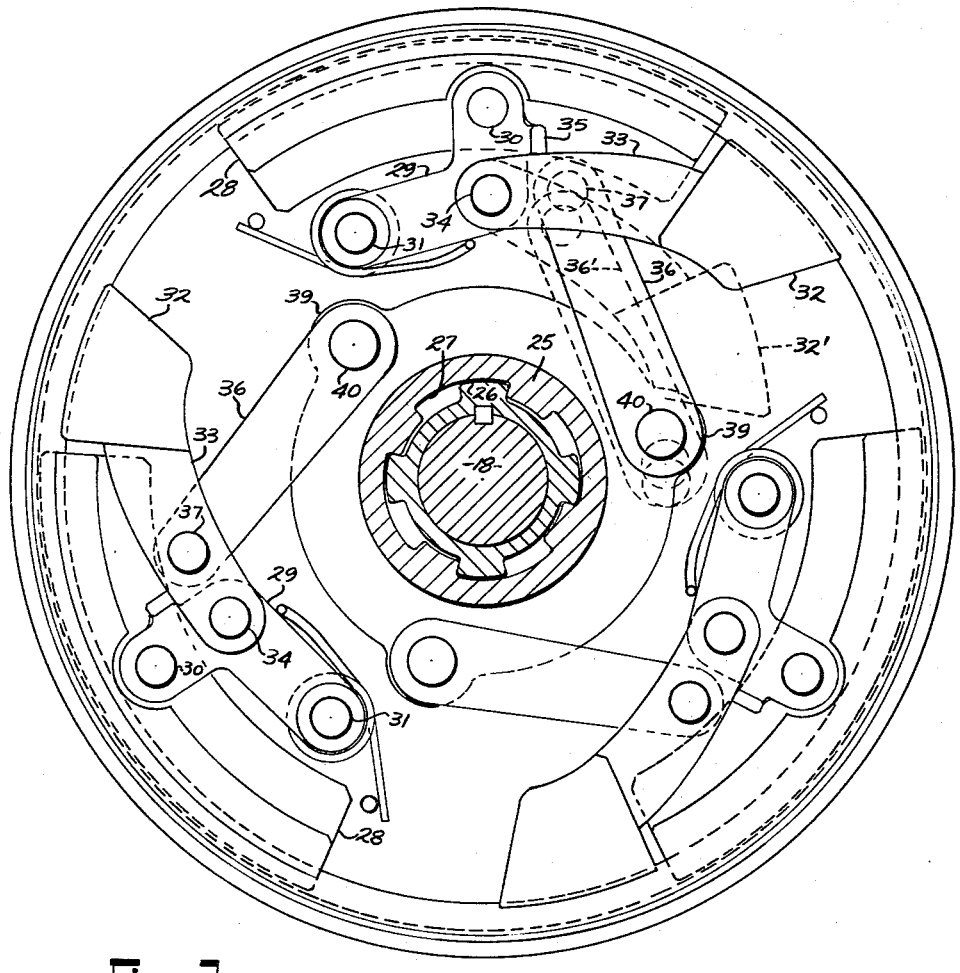
Fig. 2 is a transverse sectional view taken along the plane of line 2—2 of Fig. 1.

A plurality of spaced segmental curved friction blocks 28 are connected to the face of anchor plate 24 by means of a substantially L-shaped connecting link 29 having one end thereof fixed to the friction blocks 28 by means of pin 30 and the other end thereof pivotally secured to pin 31 which is rigidly secured to the anchor plate 24, as seen in Figs. 1 and 2. As seen in Fig. 2, the link 29 is provided with a counterweight 32. The counterweight has a connecting arm 33 which is pivotally secured to the link 29 by means of pin 34. A stop 35 on link 29 limits the movement of counterweight arm 33. An articulating link 36 has one end pivotally secured to the counterweight arm 33 by means of pin 37 and the other end thereof supported between a pair of upstanding flanges 38 and 39 by means of pin 40. The flanges 38 and 39 are rigidly secured to the portion 18a of drive shaft 18. The radial outer surface of each block 28 is provided with a plurality of parallel spaced teeth 41 which are adapted to register within the parallel spaced grooves 42 formed on the inner surface of a drum 43. The drum 43 is integral with the planet carrier 23 and together they form a common hub 44 which is journalled for rotation on the intermediate shaft 20.

A second drum 45 is supported for rotation by means of bearing 46 on the outer surface of hub 44. The second drum 45 has its open end disposed in a direction opposite to that of drum 43, heretofore described. An internal ring gear 47 is integrally associated with the inner surface of an outstanding flange 48 provided at the open end of the drum 45.

The intermediate shaft 20 has fixed thereto, or integral therewith, a sun gear 49 in mesh with a spaced series of planet gears 50 which are rotatably supported on shafts 51 fixed in planet gear carrier 23. Gears 50 in turn engage the internal ring gear 47. An annular band 52 is rigidly secured to the inner wall of the housing 10.

The band 52 lies in the same radial zone as the second drum 45. Two spaced series of pawls 53 are loosely pivotally mounted circumferentially about both the open and closed outer circumferential edges of the second drum 45. Opposed pawls are mounted on connecting pins 54 which pass through suitable apertures formed in the flange 48 of drum 45. Each series of pawls extends outwardly into a suitable groove 55 provided on the inner surface of band 52. As seen in Fig. 4, the outer curved surface of the pawl is formed of two arcs, each having a different radius. The portion 57 of the curved surface has a radius equal to the radius forming the inner surface of the band 52 while the portion 58 is circumscribed by an arc whose radius is at the center of the pawl pivot 54. The pawls are adapted during rotation of the ring gear 47 under certain conditions to move outwardly and engage the internal grooves 55 in band 52. In operation, the pawls will rotate about their pivot center 54 when the drum 45 is rotated on one direction; thus, the pawls have a sliding relationship with the grooves 55 of band 52. However, when the drum 45 is rotated in the opposite direction, the pawls due to their frictional contact with the grooves 55 will be caused to pivot in the opposite direction until the curved portion 57 resists further rotation of the drum in said direction and thereby locks out counter-rotation or counter-movement of the drum 45. Thus, it is seen that the pawls permit the drum 45 and its associated ring gear 47 to rotate in but one direction.

The operation of the device shown in Figs. 1, 2 and 3 is as follows. Assume that driven shaft 19 operatively engages a load, and must be turned to overcome the inertia of the load. A rotary driving force, whether originating from a prime mover such as steam, electricity, internal combustion engine, or otherwise, is applied to the drive shaft 18. Assuming that the grooved blocks 28 have a frictional connection with the grooved drum 43, the initial clockwise rotational movement of the drive shaft 18, as seen in Fig. 2, causes the complementary articulating linkage formed of members 29, 33 and 36 to draw the blocks 28 radially inwardly away from their contact with the grooved drum 43. It will be seen that as the drive shaft 18 is rotated in a clockwise direction the link member 36 is moved from its solid line position to a dot-dash line position 36' which has the effect of pivoting the counterweight 32 about its pivotal point 34, thus shifting its mass radially inwardly and decreasing the lineal distance covered per unit of time during rotation which thereby reduces its ability for developing an outward movement in response to centrifugal force. The inward movement of the link 36 and the counterweight 32 causes the block 28 to pivot about pin 61 and to be drawn radially inwardly thereby.

It will be understood that the initial rotative movement of a drive shaft 18 causes the disengagement of the blocks 28 from the drum 43 before the projections 26 engage the side walls of the recesses 27 formed in the hub 25 of anchor plate 24, due to the recesses 27 having a greater circumferential extent than the projections 26, as seen in Fig. 2.

Upon contact of the projections 26 with the side walls of recesses 27, the hub 25 and intermediate shaft 20 are caused to rotate together with sun gear 49 since these parts are integral. Rotation of the sun gear 49 in a clockwise direction causes the planet gears 50 to turn on their axes in a counterclockwise direction and thereby tend to drive the internal gear 47 in a counterclockwise direction. However, the internal gear 47 is prevented from rotating in a counterclockwise direction due to the pawls 53 engaging the grooves 55 of band 52, as heretofore described. Thus, since the internal gear 47 is prevented from rotating, the planet gears 50 must themselves travel about internally of the ring gear 47 and drive the carrier 23 along in a clockwise direction. Or, in other words, the planet gears 50 rotate about the sun gear 49 and carry with them their shafts 51 and carrier 23 in a clockwise direction. Since the driven shaft 19 is integral with the carrier 23, it will be caused to rotate in a clockwise direction or in the same direction as the carrier 23 and drive shaft 18.

As the resistance of the load is overcome, the engine is accelerated and the speed of the load simultaneously accelerated therewith. Upon increased engine speed, the centrifugal forces acting upon the counterweights 32 cause relative rotary movement of the counterweights with respect to pins 34 and 37 and they move radially outwardly from the dot-dash position 32' shown in Fig. 2 to the solid line position 32 shown in Fig. 2. The counterweights and their associated arms engage the stop 35 and cause the links 29 to pivot about pins 31. This causes the blocks 28 to move radially outwardly into engagement with the drum 43. Thus, as the engine load is relieved from its starting and acceleration loads, the friction members 28 and 43 progressively tend to achieve an equilibrium in which they are completely synchronized. After the block members 28 engage the drum 43 and become synchronized, a direct drive is initiated through drive shaft 18, links 36, 33 and 29, drum 43 and carrier 23 to driven shaft 19, until a drive having a 1:1 ratio is reached. In the direct drive, all of the members which have previously had individual relative motion at the start of the drive such as the intermediate shaft, its associated sun gear 49, and planetary gears 50 are now turning in unison around the axis of shaft 20.

The combination of planetary gearing and mechanisms responsive to increased centrifugal forces developed by acceleration of engine speed produces a novel torque application which can be utilized in applications having high starting loads. After the running speed has been reached, the engine or power plant can automatically handle the operating load in direct drive provided by the aforesaid combination.

In Figs. 3, 4, and 5 is shown another embodiment of my invention wherein I have incorporated means for a simple and effective reversal of the driven shaft 19. So far as is possible, the reference characters heretofore applied in Figs. 1 and 2 will be applied to identical elements in the succeeding figures. Some of the elements, though functioning similarly to those incorporated in the preceding embodiment have been changed in shape or otherwise so as to be adapted to new surroundings, and they will be given new reference characters.

In Figs. 3 to 5 the stationary housing 10 is made somewhat larger, but still has end plates 11 and 12. The use of end caps is optional and they have been omitted from the left end of Fig. 3 in order to minimize detail and show only the essential elements.

The planet gear carrier 60 takes on a new form and in the present embodiment houses a set of planet gears 61 and pinions 62. The planet gears and pinions are connected or made integral by a shaft 63. The forward portion of the carrier 60 is joined with the friction drum 43 at their respective hubs by a free peripheral mortise joint 64. Carrier 60 is freely rotatable on intermediate shaft 20. Drum 45 is supported for free rotation at its hub 65 on the carrier 60 and is further provided with a series of pawls 53 which are constructed identical to the pawls 53 of Fig. 1, as heretofore described. The pawls 53 have a sliding engagement with a pair of spaced grooves 55 provided in a floating band 66. The band 66 lies in the concentric radial zone of drum 45 and is further provided with means hereinafter described, for holding it against rotation. As seen in Figs. 3 and 4, the circumference of the band 66 is provided with a plurality of spaced radially extending lugs 67 having spaces therebetween. Means is provided in the form of a sliding bar 68, the end of which normally engages the lugs 67 provided in the outer periphery of band 66, for normally holding band 66 against rotation. The bar 68 rests in a recess 69 formed at the outer circumferential edge of a fixed disc shaped bearing support bracket 70. The bracket supports a bearing 71 in its central bore.

A third drum 72 containing an internal ring gear 73 is made integral with the driven shaft 19 at 73a.

A sun gear 49 is carried on the intermediate shaft 20 and is in mesh with the planet gears 61. The planet gears 61 in turn mesh with the ring gear 47. The pinions 62 are in mesh with the second ring gear 73.

The intermediate shaft 20 and the drive and driven shafts respectively are in axial alignment. The driving connection between the drive shaft and the intermediate shaft is identical to that described in Fig. 1. The other end of the intermediate shaft is supported for rotation in a bore 21 provided at the inner end of the driven shaft 19. The intermediate shaft 20 supports the familiar anchor plate 24 and its associated hub 25.

I have provided means for reversing the driven shaft 19, as follows. Reference has been made to a sliding bar 68 which is of such a length that when it is moved to the left, as viewed in Fig. 3, its left end interlocks with lugs 67 on the circumferential edge of the band 66 and recess 69. In order that the band be permitted to rotate, the slide bar is moved to the right, out of engagement with the lugs 67 and recess 69 and into engagement with a notch 75 provided on an annular flange member 76 which is rigidly secured to the carrier 60. Whereas previously the annular band 66 was fixed and the carrier 60 permitted to rotate, after the bar 68 is shifted to the right the carrier is fixed and the annular band can rotate.

Manipulation of the sliding bar 68 may be effected as follows. The housing 10 has a bored boss 77 thereon, which carries a shaft 78; see Figs. 3 and 4. On the inner end of the shaft is a link 79, the end of which is connected to bar 68 by means of a pivotal pin 80. Shaft 78 extends through the boss and its outer end is connected to a crank arm 81. It is apparent that by rocking the crank arm 81, the bar 68 may be reciprocated as desired.

For driving the driven shaft 19 in a forward direction, the slide bar 68 is moved to the left, as viewed in Fig. 3, between lugs 67 of band 66 with its left end seating in the recess 69 of member 70.

Again, assuming the driven shaft 19 is under load, and in forward drive, the increment of rotary driving forces imparted to the drive shaft 18 has the effect of disengaging the blocks 28 from their frictional engagement with drum 43 and in timed relation, the burden of the drive is transferred to the rest of the related elements in the driving mechanism. The intermediate shaft 20, together with its sun gear 49 is driven through the projections 26 as they engage the side walls of the slots 27. Rotation of the sun gear 49 drives the planet gears 61 which would in turn normally drive the ring gear 47 imparting a counterclockwise rotation thereto. However, since the band 66 is prevented from rotation by means of bar 68, it causes the ring gear 47 to remain stationary. The planet gears 61 are thereby forced to travel around the inside of the ring gear 47 or, in other words, about the sun gear 49. The planet gears rotate on their axis and impart a clockwise rotation to the carrier 60 in which they are housed. The clockwise travel of the planet gears 61 around the central axis of the sun gear causes rotation of the ring gear 73 which is integrally connected to the driven shaft 19 by means of drum 72 and thereby causes rotation of the driven shaft.

As the engine speed increases, the rotational speed of drive shaft 18 increases and lends to the development of centrifugal forces which eventually cause the blocks 28 to engage the drum 43, as heretofore described in regard to Figs. 1 and 2. Upon engagement of the blocks with the drum 43, the drum, because of its integral connection with the carrier 60 causes the carrier to drive ring gear 73 through the pinion 62. Driven shaft 19 is then caused to be rotated due to the integral connection between drum 72, containing internal ring gear 73, and the driven shaft 19.

Under heavy load, the blocks 28 are held out of engagement with the drum 43, thereby concentrating the drive through the gearing.

Under intermediate load or speed conditions, as the load decreases, the torque requirements decrease, and as the torque requirements decrease, the forces keeping the blocks and drum out of engagement decrease to the point where centrifugal force eventually causes engagement between these respective parts.

In order to reverse the direction in which the driven shaft 19 is to be rotated, the slide bar 68 is moved to the right, as seen in Fig. 3, out of engagement with the lugs 67 and recess 69 and into engagement with notch 66 and a recess 84 of member 85. It will be readily apparent that upon clockwise rotation of the intermediate shaft 20 and sun gear 49, the planet gears 61 will be caused to rotate in a counterclockwise direction. The ring gear 47 will be free to rotate since the band member 66 has been freed due to the movement of bar 68 to the right. The carrier 60 is thus held fast by means of the bar 68 engaging the notch 75 provided in the periphery of member 76. Thus, the planet gears 61 remain in a fixed position while they rotate in a counterclockwise direction. Rotation of the planet gears 61, of course, causes the pinions 62 to rotate via the rigid shaft 63 and thereby drive the third drum 72 by means of internal ring gear 73, in a counterclockwise direction. Consequently, the driven shaft which is integrally connected with the drum 72 is caused to be rotated in a reverse direction from that previously described.

The driving force in the load inertia influence the disengagement of the drum 43 by the blocks 28, when driving in a reverse direction, in the same manner as one being driven in a forward direction. Thus, due to the fact that the drum 43 and its connected carrier 60 are made immobile by the disengagement of the blocks from the drum, excessive speeds in the reverse direction need not be feared.

I have now fully described the structure shown in the drawings. It will be apparent to those skilled in the art that various modifications may be made in the apparatus without departing from the scope of the invention. Furthermore, it will be apparent that a plurality of units as described in the present invention may be combined in parallel or series in almost an infinite variety of ways so as to provide different ratios between the driving and driven shafts. The possible combinations of two or more of these units having like or dissimilar output characteristics for obtaining expanded output results is limitless.

In view of the foregoing description, taken in conjunction with the accompanying drawings, it is believed that a clear understanding of the construction, operation and advantages of the device will be quite apparent to those skilled in this art.

Having thus described my invention and illustrated its use, what I claim is new and desire to secure by Letters Patent is:

1. Power transmission means of the character described comprising axially aligned driving, intermediate and driven shafts, means for supporting said intermediate shaft for rotation between said driving and driven shafts, a sun gear fixed on said intermediate shaft, a planet gear carrier, a drum supported on said intermediate shaft having an annular flange surrounding a portion of said intermediate shaft radially outwardly and in the plane of said sun gear, a ring gear fixed on the inner periphery of said flange, a plurality of planet gears on said carrier surrounding said sun gear and in mesh therewith and with said ring gear, a second drum fixed to said planet gear carrier and freely rotatably mounted on said intermediate shaft, said second drum having an annular flange surrounding a portion of said drive shaft radially outwardly therefrom, said carrier being in driving engagement with said driven shaft, means engageable between said drive and intermediate shafts for driving said intermediate shaft, means adapted to frictionally engage said annular flange surrounding said drive shaft, articulating links connecting said drum engaging means to said drive shaft, whereby upon a predetermined rotational speed of said drive shaft said drum engaging means are caused to engage said drum due to centrifugal force.

2. Power transmission means of the character defined in claim 1 wherein said first-named drum has associated therewith means for holding said drum and associated ring gear stationary.

3. Power transmission means of the character defined in claim 1 wherein counterweight means are associated with said articulating links, said counterweights moving radially outwardly in response to centrifugal force as the rotational speed of the driven shaft increases, thereby assuring engagement of said blocks with said drum.

4. Power transmission means of the character described comprising axially aligned driving, intermediate and driven shafts, means for supporting said intermediate shafts for rotation between said driving and driven shafts, a sun gear fixed on said intermediate shaft, a planet gear carrier in driving engagement with said driven shaft, a drum supported on said intermediate shaft having an annular flange surrounding a portion of said intermediate shaft radially outwardly and in the plane of said sun gear, a ring gear fixed on the inner periphery of said flange, a second drum fixed to said planet gear carrier and rotatably mounted on said intermediate shaft, said second drum having an annular flange, means engageable between said drive and intermediate shafts for driving said intermediate shaft, means adapted to frictionally engage said annular flange of said drum, means pivotally connecting said drum engaging means to said drive shaft, whereby upon predetermined rotational speed of said drive shaft said drum engaging means are caused to engage said drum due to centrifugal force.

5. Power transmission means of the character defined in claim 4 wherein said first-named drum has associated therewith means for holding said drum and associated ring gear stationary.

6. Power transmission means of the character described comprising axially aligned driving, intermediate and driven shafts, a sun gear fixed on said intermediate shaft, a ring gear rotatably mounted with said intermediate shaft and outwardly from said sun gear and in the plane thereof, a plurality of planet gears surrounding said sun gear and in mesh therewith and with said ring gear, a carrier supporting said planet gears fixed with respect to said driven shaft, a drum fixed to said carrier, means forming a driving connection between said drive shaft and said intermediate shaft, said drum having an annular flange surrounding a portion of said driving shaft radially outwardly therefrom, the inner periphery of said flange being provided with a plurality of radially spaced parallel annular grooves, a plurality of spaced segmental blocks having spaced parallel upstanding ridges provided thereon, said upstanding ridges adapted to engage the grooves of said flange, articulating links connecting said blocks to said drive shaft, whereby initial rotative movement of said drive shaft causes a torque to be delivered to said driven shaft through the gearing which overcomes starting inertia and smooths out load shocks and heavy load variations, said blocks engaging said drum due to centrifugal forces upon increased rotational speed of said drive shaft thereby providing a direct drive between said driving and driven shafts.

7. Power transmission means of the character defined in claim 6 wherein counterweight means are associated with said articulating links, said counterweights moving radially outwardly in response to centrifugal force as the rotational speed of the driven shaft increases, thereby assuring engagement of said blocks with said drum.

8. Power transmission means of the character defined in claim 6 wherein said drum has associated therewith means for holding said drum and associated ring gear stationary.

9. Power transmission means of the character defined in claim 1 wherein the said means engageable between said drive and intermediate shafts includes a lost motion connection.

References Cited in the file of this patent

UNITED STATES PATENTS

| | | |
|---|---|---|
| 1,919,876 | Mielke et al. | July 25, 1933 |
| 1,984,131 | Hamilton | Dec. 11, 1934 |
| 2,102,524 | Fieux | Dec. 14, 1937 |
| 2,399,319 | Bowen et al. | April 30, 1946 |
| 2,429,509 | Breckenridge | Oct. 21, 1947 |
| 2,471,669 | Baker | May 31, 1949 |
| 2,534,426 | Eason | Dec. 19, 1950 |
| 2,655,820 | Baines | Oct. 20, 1953 |
| 2,719,442 | O'Leary | Oct. 4, 1955 |

FOREIGN PATENTS

| | | |
|---|---|---|
| 413,517 | Germany | May 14, 1925 |
| 537,411 | Germany | Nov. 2, 1931 |